United States Patent

[11] 3,630,188

[72] Inventor  Hugh Ross
            820 Camp Horne Road, Pittsburgh, Pa.
            15237
[21] Appl. No. 10,734
[22] Filed     Feb. 12, 1970
[45] Patented  Dec. 28, 1971

[54] CHARCOAL COOKING GRILL
     1 Claim, 2 Drawing Figs.
[52] U.S. Cl. ........................................ 126/25 R,
                                                126/137
[51] Int. Cl. ............................................ A47j 37/00,
                                                F24b 3/00
[50] Field of Search ........................................ 126/9, 25,
                                                25 A, 30, 137

[56]            References Cited
            UNITED STATES PATENTS
2,164,835  7/1939  Pearson et al. ................ 126/25
2,604,884  7/1952  Walker.......................... 126/25 A UX
3,359,887  12/1967 Cleveland..................... 126/25 A X
3,391,685  7/1968  Lemmons et al. ............ 126/25 A X

*Primary Examiner*—Charles J. Myhre
*Attorney*—Brown, Murray, Flick & Peckham

ABSTRACT: A charcoal cooking grill comprising an elongated trough for receiving charcoal and having a grill fitted over its top. Connected to the trough is a single set of legs, each having an inclined, generally vertical portion and a horizontally extending dogleg portion which rests on a supporting surface. With this arrangement, the grill may be fitted into the opening in a home fireplace without removing a grate from the hearth, the dogleg portions of the legs fitting under the grate. Furthermore, a pair of such grills may be fitted within the hearth in tandem without removing the grill.

PATENTED DEC 28 1971

3,630,188

INVENTOR.
HUGH ROSS
BY
Brown, Murray, Flick
and Peckham
ATTORNEYS

CHARCOAL COOKING GRILL

BACKGROUND OF THE INVENTION

Many types of charcoal grills have been developed in the past, however most of these are of rather flimsy design and are intended for outdoor use only. In certain cases, particularly during the winter months, it is desired to charcoal cook food in an indoor fireplace. Most charcoal cooking apparatus presently available will not fit into a fireplace opening; and even if it will, it becomes necessary to remove a grate from the fireplace hearth before the cooking apparatus can be installed in place. Needless to say, this is a nuisance and discourages the use of grills in an indoor fireplace.

SUMMARY OF THE INVENTION

In accordance with the present invention, a cooking grill is provided comprising an elongated trough of relatively narrow depth and short enough to fit into a fireplace opening. The trough receives charcoal and is provided with a slidable, removable grill which fits over its top. Secured to one side of the trough is a single set of legs, each having an inclined, generally vertical portion and a horizontally extending dogleg portion which rests on a supporting surface. The horizontally extending dogleg portions can, therefore, be fitted underneath the fireplace grate without removing the grate itself. Furthermore, since the grill occupies only the front portion of the fireplace opening, the fire within the gate need not be extinguished when the grill is positioned within the fireplace opening, it being necessary only to push the burning embers to the back of the grate.

Further, in accordance with the invention, two grills can be arranged in tandem, one behind the other. That is, the horizontally extending dogleg portions of the legs of one grill can fit under the grate from the back thereof; while the dogleg portions of the other grill can fit under the front portion of the grate.

The grill is such that it can be used either in a fireplace or removed from the fireplace and used outside. Thus, the grill of the type disclosed herein can be used both during the wintertime and in the summer. It is constructed from heavy gauge steel such that it will withstand repeated use over a number of years and has no parts which can become easily damaged such as wooden handles, aluminum tubing or the like.

The above and other objects and features of the invention will become apparent from the following detailed description taken in connection with the accompanying drawings which form a part of this specification and in which.

Figure 2:
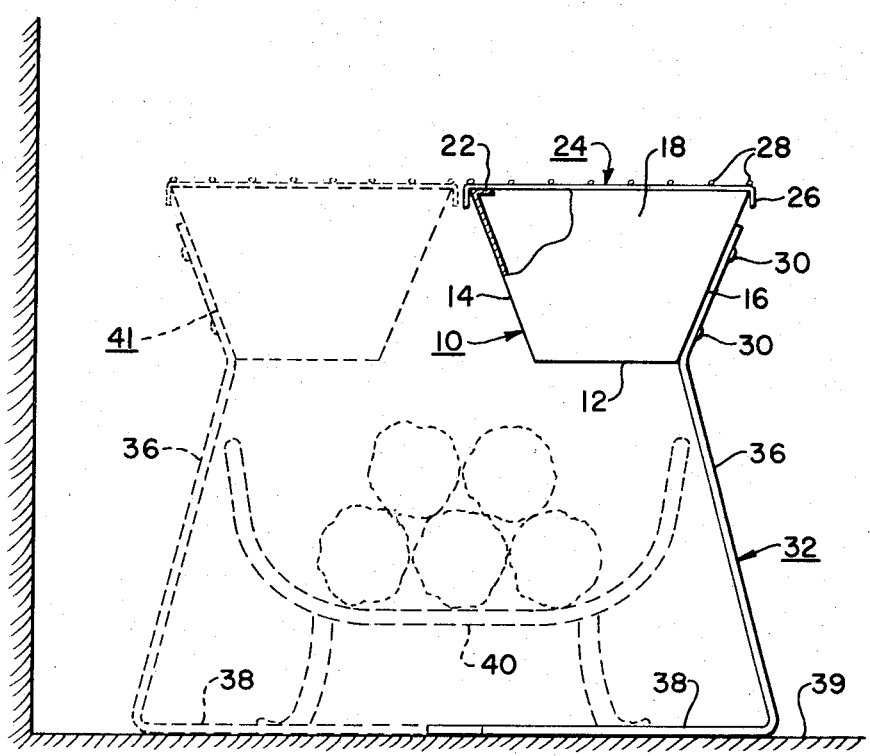
FIG. 2 is a side view of the grill showing the manner in which it can be fitted into a fireplace opening without removing a grate and additionally showing the manner in which two of such grills can be arranged in tandem.
Figure 1:
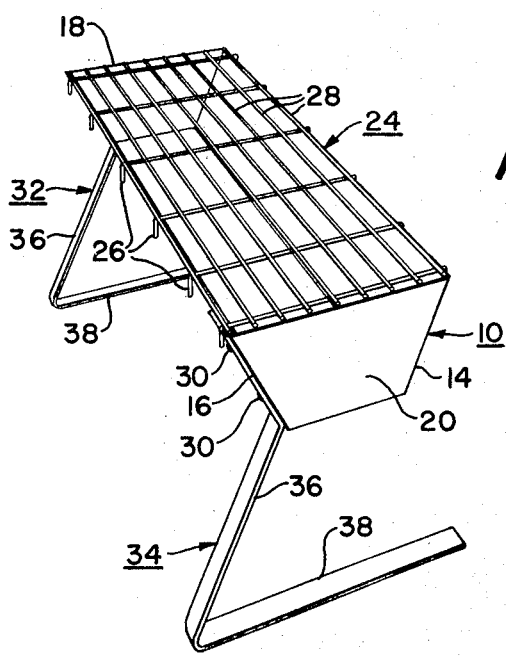
FIG. 1 is a perspective view of the cooking grill of the invention.

With reference now to the drawings, the grill shown includes a trough 10 preferably formed from 16 gauge steel sheet and having a bottom or floor 12 bounded by inclined sidewalls 14 and 16. At opposite ends of the trough 10 are endplates 18 and 20 welded to the sides 16 and 14 along inclined vertical edges. The bottoms of the plates 18 and 20, however, are not welded to the bottom 12 of the trough. This provides slits through which water may escape in the event the grill is used outside and accumulates rain water or the like.

The upper edges of the sidewalls 14 and 16 are bent inwardly as at 22 (FIG. 2) to give the trough additional strength.

Fitted over the top of the trough 10, which is adapted to receive charcoal, is a chrome-plated grill assembly 24 comprising a plurality of U-shaped members 26 (FIG. 2) which extend across the top of the trough and are interconnected by means of wires 28. With this arrangement, the grill assembly 24 may slide back and forth along the trough 10. This is advantageous in that charcoal may be piled at one position along the trough and the meat or other article to be cooked placed on the grill over the pile of charcoal. If the charcoal becomes too hot and there is danger of burning the food, the grill assembly 24 may be caused to slide to the left or right, thereby removing the food from its position over the charcoal. When it is again desired to initiate cooking of the food, the grill assembly may be moved back to a position where the food is over the charcoal without requiring movement of the food on the grill assembly by means of a fork or the like.

Secured to the forward sidewalls 16 of the trough 10 by means of bolts or rivets 30 are two legs 32 and 34 each comprising a generally inclined vertical portion 36 and a horizontally extending dogleg portion 38 which rests on a supporting surface, this surface comprising a fireplace hearth 39 in FIG. 2.

In this manner, and as best shown in FIG. 2, the dogleg portions 38 may be fitted underneath a fireplace grate 40 without removing the grate from the fireplace opening. Furthermore, and as shown by the dotted outline in FIG. 2, a second grill 41 may be positioned behind the first with its dogleg portions 38 beneath the back portion of the grate 40.

After the food has been cooked on the grill assembly, it may be removed from trough 10, the legs 32 and 34 grasped, and the ashes dumped into the grate 40. At the same time, the grill may be removed from the fireplace opening and used outside. If this is the case, the grill can be stored in the fireplace opening during the summer months or when not in use such that it does not occupy space in a garage or the like.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A cooking grill comprising an elongated trough for receiving material capable of generating heat and provided with a generally horizontal bottom and integral sloped side walls extending along the length of the trough, end plates secured only to said sidewalls to provide slits between the bottoms of the sidewalls and said bottom through which water can drain, a pair of legs secured to said trough for supporting it above a supporting surface, each of said legs having a downwardly depending portion which slopes away from the trough and a horizontally extending integral dogleg portion which rests on said supporting surface, both of said dogleg portions extending in the same direction whereby the legs may rest on a fireplace hearth with the trough being positioned above a grate within the fireplace, and a grill structure fitted over the top of said trough for supporting food to be cooked, said grill structure comprising a plurality of inverted U-shaped cross members which fit over the top of said trough and are secured together by means of elongated wires whereby the grill may slide back and forth across the top of the trough.

* * * * *